US008972330B2

(12) United States Patent
Zhao

(10) Patent No.: US 8,972,330 B2
(45) Date of Patent: Mar. 3, 2015

(54) IDENTIFICATION OF SIGNIFICANT SEQUENCES OF FAULT CODES BY STATISTICAL HYPOTHESIS TESTING

(75) Inventor: Shi Zhao, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 605 days.

(21) Appl. No.: 13/209,583

(22) Filed: Aug. 15, 2011

(65) Prior Publication Data

US 2013/0046724 A1 Feb. 21, 2013

(51) Int. Cl.
| | |
|---|---|
| G06F 9/44 | (2006.01) |
| G06N 7/02 | (2006.01) |
| G06N 7/06 | (2006.01) |
| G06N 5/02 | (2006.01) |
| G06Q 10/00 | (2012.01) |
| G06F 11/07 | (2006.01) |

(52) U.S. Cl.
CPC ............. G06N 5/02 (2013.01); *G06F 11/079* (2013.01); G06Q 10/20 (2013.01)
USPC .......................................................... 706/52

(58) Field of Classification Search
CPC .................................................... G06Q 10/20
See application file for complete search history.

(56) References Cited

U.S. PATENT DOCUMENTS

| | | | | |
|---|---|---|---|---|
| 6,535,865 | B1* | 3/2003 | Skaaning et al. ............... 706/52 |
| 6,763,482 | B2* | 7/2004 | Bernklau-halvor ............ 714/25 |
| 6,782,345 | B1* | 8/2004 | Siegel et al. ................. 702/183 |
| 6,782,495 | B2* | 8/2004 | Bernklau-Halvor ............ 714/44 |
| 7,174,264 | B2* | 2/2007 | Yasukawa et al. ............. 702/115 |
| 7,243,045 | B2* | 7/2007 | Uwatoko et al. ............. 702/183 |
| 7,467,841 | B2* | 12/2008 | Kamisuwa et al. ............ 347/19 |
| 7,778,943 | B2* | 8/2010 | Guralnik et al. ............... 706/12 |
| 2007/0028220 | A1* | 2/2007 | Miller et al. ................. 717/124 |

OTHER PUBLICATIONS

Kirsch, Harald, and Khristian Kroschel. "Applying Bayesian networks to fault diagnosis." Control Applications, 1994., Proceedings of the Third IEEE Conference on. IEEE, 1994.*

Lauber, Johannes, Christian Steger, and Reinhold Weiss. "Autonomous agents for online diagnosis of a safety-critical system based on probabilistic causal reasoning." Autonomous Decentralized Systems, 1999. Integration of Heterogeneous Systems. Proceedings. The Fourth International Symposium on. IEEE, 1999.*

(Continued)

*Primary Examiner* — Kakali Chaki
*Assistant Examiner* — Daniel Pellett
(74) *Attorney, Agent, or Firm* — MH2 Technology Law Group LLP

(57) ABSTRACT

In some aspects of the present application, a method for identifying significant events related to machine problems. The method includes receiving one or more machine problems; determining one or more machine problem classifications based on the one or more machine problems; generating a probability distribution that the one or more machines problems are related to the one more machine problem classifications; determining if one or more events are associated with the one or more machine problems during a predetermined time interval; and determining if the one or more events are significantly related to the one or more machine problem classifications using a statistical algorithm.

15 Claims, 3 Drawing Sheets

(56) References Cited

OTHER PUBLICATIONS

Mishra, Anand, and Tulay Adali. "Bayesian belief networks for effective troubleshooting." Neural Networks, 1999. IJCNN'99. International Joint Conference on. vol. 5. IEEE, 1999.*

Heckerman, David, John S. Breese, and Koos Rommelse. "Decision-theoretic troubleshooting." Communications of the ACM 38.3 (1995): 49-57.*

Koutsoukos, Xenofon, et al. "Fault modeling for monitoring and diagnosis of sensor-rich hybrid systems." Decision and Control, 2001. Proceedings of the 40th IEEE Conference on. vol. 1. IEEE, 2001.*

Zhao, Feng, et al. "Monitoring and fault diagnosis of hybrid systems." Systems, Man, and Cybernetics, Part B: Cybernetics, IEEE Transactions on 35.6 (2005): 1225-1240.*

* cited by examiner

| SUBSYSTEMS (MACHINE PROBLEM CLASSIFICATION) | DISTRIBUTION (PROBABILITY) |
|---|---|
| ELECTRICAL/UI/NET CONTRLR | 0.15 |
| FINISHING | 0.12 |
| INTEGRATED SYSTEM | 0.15 |
| PAPER FEED/REG | 0.17 |
| PRINT Xport/FUSING | 0.10 |
| SCANNER/DOC HANDLER | 0.13 |
| XEROGRAPHICS/ROS | 0.18 |

FIG. 2

| SUBSYSTEMS (MACHINE PROBLEM CLASSIFICATION) | DISTRIBUTION (# TIMES RELATED CORRESPONDING SUBSYSTEM) |
|---|---|
| ELECTRICAL/UI/NET CONTRLR | 4 |
| FINISHING | 0 |
| INTEGRATED SYSTEM | 3 |
| PAPER FEED/REG | 0 |
| PRINT Xport/FUSING | 0 |
| SCANNER/DOC HANDLER | 0 |
| XEROGRAPHICS/ROS | 0 |

FIG. 3

IDENTIFICATION OF SIGNIFICANT SEQUENCES OF FAULT CODES BY STATISTICAL HYPOTHESIS TESTING

DESCRIPTION OF THE DISCLOSURE

1. Field of the Disclosure

The present application is directed to an identification technique of significant sequences of fault codes by statistical hypothesis testing.

2. Background of the Disclosure

In conventional maintenance assistant, service is performed based on an individual's domain knowledge expertise. Thus, the service is very heuristic, involving a great deal of randomness. For example, when fixing a machine problem, a customer service technician would look at machine logs. From the machine log history, the customer service technician would pick up some information he/she thought "useful" to diagnose the problem. The customer service technician would keep trying until the problem was successfully solved. On average, the repair process is long and costly.

What is need is an improved method to identify significant sequences of fault codes to reduce machine downtime and improve machine performance.

SUMMARY OF THE DISCLOSURE

In accordance with some aspects of the present disclosure, a method for identifying significant sequences of fault codes related to machine problems is disclosed. The method can include receiving one or more machine problems; determining one or more machine problem classifications based on the one or more machine problems; generating a probability distribution that the one or more machines problems are related to the one more machine problem classifications; determining if one or more events are associated with the one or more machine problems during a predetermined time interval; and determining if the one or more events are significantly related to the one or more machine problem classifications using a statistical algorithm.

In some aspects, the one or more events can include one or more fault codes related to a fault associated with the one or more machine problem classifications.

In some aspects, the predetermined time interval can be between about 2 and 10 days.

In some aspects, the method can include receiving an identification of the one or more machine problems, one or more machine problem classifications, a fault code related to the one or more machine problems, or combinations thereof from a user.

In some aspects, the method can include determining if two or more events for a particular machine problem are significantly related using hypothesis testing; and arranging the two or more events into an event sequence if the two or more events that are determined to be significant.

In some aspects, the determining can include determining if the event sequence is significant if and only if any events in the event sequence are pair wise favorably associated. Additionally or alternatively, the determining can include determining if the event sequence is significant if and only if there is a path of events in the event sequence which is step wise favorably associated.

In some aspects, the machine problem classifications can include one or more subsystems related to a machine type.

In some aspects, the probability distribution can be a multinomial distribution.

In accordance with aspects of the present disclosure, an apparatus arranged to identify significant sequences of fault codes related to machine problems is disclosed. The apparatus can include a processor in communication with a memory having instructions, that when executed by the processor cause the processor to: receive one or more machine problems; determine one or more machine problem classifications based on the one or more machine problems; generate a probability distribution that the one or more machines problems are related to the one more machine problem classifications; determine if one or more events are associated with the one or more machine problems during a predetermined time interval; and determine if the one or more events are significantly related to the one or more machine problem classifications using a statistical algorithm.

In some aspects, the one or more events can include one or more fault codes related to a fault associated with the one or more machine problem classifications.

In some aspects, the predetermined time interval can be between about 2 and 10 days.

In some aspects, the processor can be further configured to receive an identification of the one or more machine problems, one or more machine problem classifications, a fault code related to the one or more machine problems, or combinations thereof from a user.

In some aspects, the processor can be further configured to determine if two or more events for a particular machine problem are significantly related using hypothesis testing and arrange the two or more events into an event sequence if the two or more events that are determined to be significant.

In some aspects, the event sequence is significant if and only if any events in the event sequence are pair wise favorably associated. Additionally or alternatively, the event sequence is significant if and only if there is a path of events in the event sequence which is step wise favorably associated.

In some aspects, the machine problem classifications can include one or more subsystems related to a machine type.

In some aspects, the probability distribution can be a multinomial distribution.

In accordance with aspects of the present disclosure, an article of manufacture is disclosed that includes a storage medium having instructions, that when executed by a processor cause the processor to: receive one or more machine problems; determine one or more machine problem classifications based on the one or more machine problems; generate a probability distribution that the one or more machines problems are related to the one more machine problem classifications; determine if one or more events are associated with the one or more machine problems during a predetermined time interval; and determine if the one or more events are significantly related to the one or more machine problem classifications using a statistical algorithm.

In some aspects, the article can include instructions to cause the processor to determine if two or more events for a particular machine problem are significantly related using hypothesis testing and arrange the two or more events into an event sequence if the two or more events that are determined to be significant.

In some aspects, the event sequence is significant if and only if any events in the event sequence are pair wise favorably associated. Additionally or alternatively, the event sequence is significant if and only if there is a path of events in the event sequence which is step wise favorably associated.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

BRIEF DESCRIPTION OF THE DRAWINGS

FIG. 2 shows an example probability distribution of machine problems (customer calls) versus machine problem classifications in accordance with aspects of the present disclosure.

FIG. 3 shows an example event or event sequence versus machine problem distribution in accordance with aspects of the present disclosure.

DESCRIPTION OF THE EMBODIMENTS

Figure 1:
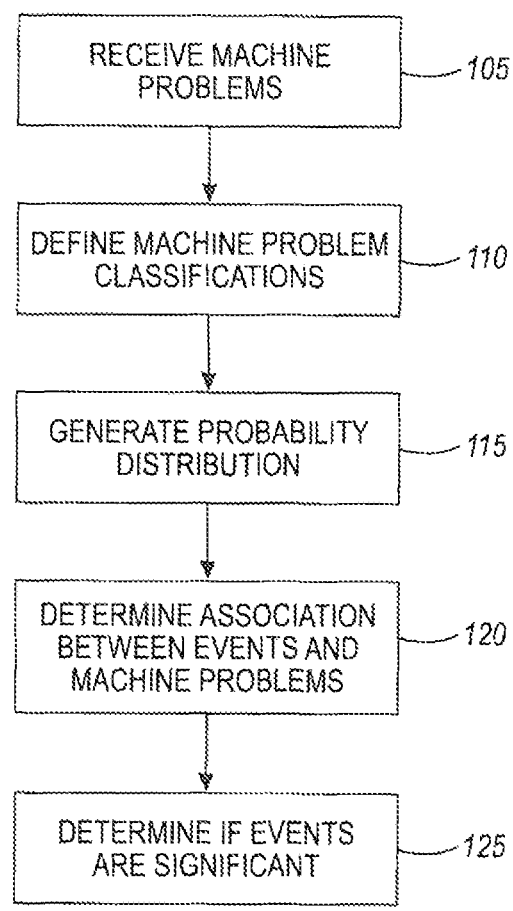
FIG. 1 shows an example flow chart in accordance with aspects of the present disclosure.

Reference will now be made in detail to various exemplary embodiments of the present application, examples of which are illustrated in the accompanying drawings. Wherever possible, the same reference numbers will be used throughout the drawings to refer to the same or like parts.

In accordance with aspects of the present disclosure, a method to filter out randomness and identify the statistically significant fault code (related to the machine problem) and a path (sequential/parallel hypothesis testing) is described to focus on a manageable knowledge if the significant fault codes are too many (which means the information provided by them are too broad and vague).

FIG. 1 shows an example flow chart in accordance with aspects of the present disclosure. One or more machine problems are received at 105. For example, when an office machine, such as a printer, fax machine, copier, or multifunction device, malfunctions, a user will typically contact a service or customer center responsible for servicing the machine to remedy the malfunction. The office machine could be malfunctioning due to a fault in one or more subsystems of the machine. These subsystems, also called machine problem classifications, can include a plurality of categories. By way of a non-limiting example, consider a multifunction printer, copier and fax device. This device can include the following seven subsystems that may generate one or more faults if the machine malfunctions: electrical/UUNet Contlr; Finishing; Integrated System; Paper/Feed Reg; Printer Xport/Fusing; Scanner/Doc Handler; and Xerographics/ROS. The user can supply a representative of the service center with information related to the office machine and a fault description.

At 110, the machine problem classification is determined based on the information supplied by the user. At 115, a baseline probability distribution is created for machine problems (customer calls) over machine problem classifications (subsystems, problem code, etc). FIG. 2 shows an example probability distribution for the above example. In the data set, the machine problems are identified by the customer calls; the events are corresponding to fault codes and the machine problem classifications are meant to be the subsystems. In this example, there are 4796 customer calls, 818 fault codes and 7 subsystems. For the seven subsystems, the probability that a customer call was for a particular subsystem was: 15% for Electrical/UI/Net Contlr; 12% for Finishing; 15% for Integrated System; 17% for Paper/Feed Reg; 10% for Printer Xport/Fusing; 12% for Scanner/Doc Handler; and 18% for Xerographics/ROS.

This distribution is taken as the baseline when identifying the association between fault codes and machine problem classifications. The distribution can be a multinomial distribution where K is the number of problem classifications and N is the total number of machine problems. $X_i=1$ if the $i^{th}$ machine problem falls in the class 1, $i=1\ldots N$ and $I=1\ldots K$. Pl is the probability of a machine problem in the class 1, which is estimated by $(\Sigma I\,\{X_i=1\}/N)$. $1\{\}$ is an indicator function. In some aspects, customer calls can be treated as machine problems and subsystems can be treated as machine problem classification.

Returning to FIG. 1, a determination is made at 120 as to whether one or more events, for example, fault codes, are associated with a particular machine problem. For example, a service center responsible for servicing a particular machine can receive periodic status information from the device over a network. The status information can include one or more fault codes. When a customer call is received that a malfunction of a device as occurred, the service center can investigate a log of fault codes it has received for that particular device. For example, the log can be investigated for faults between 2 and 10 days before the time of the customer called reporting the malfunction.

The relevance to the one or more fault codes and the machine problem classification is determined. For example, $Z_{ij}=1$ if the event (or fault code) j presents in the machine problem i, else $Z_{ij}=0$, $i=1\ldots N$ and $j=1\ldots M$, where M is the total number of events. If S is an event combination or sequence, $Z_iS=\Pi Z_{ij}$ with event j in S. In some aspects, a fault code can be considered as the unique diagnostic variable, thus event here can mean fault code. In some aspects, events can represent other meaning (useful) variables.

Continuing with the example above, FIG. 3 shows a distribution that one or more events or fault codes are related to one or more machine problem classifications. For example, for a fault code "16.602.28," its distribution (number of times it is related to a corresponding subsystem) is as follows: 4 for Electrical/UUNet Contlr; 0 for Finishing; 3 for Integrated System; 0 for Paper/Feed Reg; 0 for Printer Xport/Fusing; 0 for Scanner/Doc Handler; and 0 for Xerographics/ROS. In other words, the fault code "16.602.28" only corresponds to two subsystems, which are the Electrical/UUNet Contlr and Integrated System.

A distribution can generated for event distribution over problem classifications, which can be compared with the baseline distribution to justify the significance association between corresponding event and machine problem classifications. For $i=1\ldots N$ and $j=1\ldots M$, $Y_{ij}=Z_{ij}*X_i$. Qjl is the probability of the event j in the class i, which is estimated by $(\Sigma\{Y_{ij}=1\}/N)$. If Qjl is statistically different from Pl across 1, then event j is statistically associated to one or more classes, rather than random association between machine problems and classes.

At 125, a determination is made as to whether events are significant. In some aspects, a significant events testing can be performed as follows. $P=(P1, P2, \ldots, PK)$ and $Qj=(Qj1, Qj2, \ldots, QjK)$, for $j=1\ldots M$. A hypothesis test is used. The null hypothesis, denoted by the 0 argument, is: H0: Qj=P and the alternative hypothesis, denoted by the A argument, is HA: Qj!=P.

Test statistics is derived through log-likelihood ratio: $G=2*\Sigma Qjl*IN(Qjl/Pl)$. G is approximately distributed as Chi-square distribution. The null hypothesis is rejected if G>Chi (K-1, 0.95), where Chi (K-1, 0.95) is the $95^{th}$ percentile of Chi-square distribution with K-1 degree of freedom. The test can be controlled by defaulting type 1 (false positive results) error as 0.05.

Only significant events will be considered to include in the sequence. Significant sequence of events will be defined as the events in the sequence are not randomly associated, but favorably associated with each other, which is different significant definition from the above significant events. Events A and B are favorably not randomly associated (independent): P(A and B) >P(A)*P(B) where ">" means statistically greater.

In accordance with some aspects of the present disclosure, different ways of testing a sequence can be used. For example, suppose S={e1,e2,...,eV}, where V=|S| and e1, e2 ... are the events in the sequence S. S is significant if and only if any events in S are pair wise favorably associated. For any if in 1 ... V, P (ei and ej)>P(ei)*P(ej). It is equivalent to test V*(V-1)/2 hypothesis simultaneously: H0: P(ei and ej)=P(ei)*P(ej) vs HA: P(ei and ej)>P(ei)*P(ej).

In this example, overall type 1 error (0.05) can be controlled, thus if denote each individual type 1 error as alphat, where t indexes the V*(V-1)/2 tests, then Σalphat_t ≤0.05. This example is a conservative method of selecting significant sequence. Only all the events in the sequence are pair wise positively correlated, the sequence would be considered as significant.

By way of another example, S is significant if and only if there is a path of events in S which is step wise favorably associated. There exists (i1, i2, ..., iV) such that P({eil ... ei(k-1)} and eik) >P({eil ... ei(k-1)})*P(eik) for k=2, ..., V. It is equivalent to test V-1 hypothesis one by one: H0: P({eil ... ei(k-1)} and eik)=P({eil ... ei(k-1)})*P(eik) vs HA: P({eil ... ei(k-1)} and eik) >P({eil ... ei(k-1)})*P(eik) where K=2 ... V.

In this example, each individual test's type 1 error can be controlled to be less overall default (0.05). This example is a more generous method of selecting significant sequence. It includes the situation that an event is associated with an event sequence, maybe not associated with each individual in the sequence.

Continuing with the example above, the test statistics or log-likelihood ratio (G) for fault code "16.602.28" is 17.27, where the number of degrees of freedom is 6 (the number of subsystem classes (7)-1). Referring to the Chi-square distribution at significance level 0.01, we can tell this fault code is significantly related to certain machine problems, i.e., Electrical/UI/Net Contrlr and Integrated System. Thus we should use it to diagnose machine problems. In some aspects, the significance level can be between 0.01 and 0.05 depending on how much tolerance for error is permitted.

Out of 818 fault codes, there are only 225 significant ones, meaning that we can filter out a big portion of fault codes (occur randomly or triggered by other significant fault codes), and only keep the informative ones for the diagnosis.

Typically, a single fault code is not enough to provide sufficient information to identify the machine problem since it tends to provide limited and vague information. If there were other fault code associated with it, a better understanding of the problem could be achieved, since this fault code combination would limit the causes of the machine problem in a very small range. Therefore, the search for fault code sequence using the disclosed hypothesis testing provides a better change that machine problems can be addressed in a more efficient manner. For example, using the example above with the fault code "16.602.28," five significant fault code pairs including "16.602.28," i.e. "16.602.28" with "16.630.46," "16.602.28" with "16.750.46," "16.602.28" with "16.754.14," "16.602.28" with "16.760.19," with "16.602.28" with "16.761.19" is found. If the fault code pairs are extended to fault code triples, no triples were found using the conservative method; however, if the less conservative example is used, the significant fault code combination can be extended to "16.602.28" with "16.630.46" with "16.750.46" with "16.754.14" with "16.760.19" with "16.761.19." The intersection of the information contained in each fault code can be much clearer and related the machine problem, which can expedite the whole diagnosis process to save service time (cost).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an acid" includes two or more different acids. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method for identifying significant events related to machine problems, the method comprising:
   receiving one or more machine problems and associated one or more fault codes;
   determining one or more machine problem classifications based on the one or more machine problems and the associated one or more fault codes that were received;
   generating a log of the one or more machine problems, the associated one or more fault codes, and the one or more machine problem classifications that were determined from a plurality of users for a predetermined time interval;
   generating a baseline probability distribution comprising the one or more machines problems with respect to the one or more machine problem classifications;
   for each fault code that was received, calculating a secondary probability distribution comprising a number of times that each of the associated fault codes occurred for the one or more machine problems classifications that were determined;
   determining that two or more fault codes in the log are significantly related to the one or more machine problems using a Chi-squared distribution test to compare the baseline probability distribution against each of the second probability distributions; and
   diagnosing the machine problems using the one or more fault codes that were determined to be significantly related.

2. The method according to claim 1, wherein the predetermined time interval is between about 2 and 10 days.

3. The method according to claim 1, wherein the determining that two or more fault codes in the log are significantly related if and only if the two or more fault codes are pair wise favorably associated.

4. The method according to claim 1, wherein the determining that two or more fault codes in the log are significantly related if and only if there is a path of events between the two or more fault codes that is step wise favorably associated.

5. The method according to claim 1, wherein the machine problem classifications include one or more subsystems related to a machine type.

6. The method according to claim 1, wherein the baseline probability distribution is a multinomial distribution.

7. An apparatus arranged to identify significant sequences of fault codes related to machine problems, the apparatus comprising:
 a processor in communication with a memory having instructions, that when executed by the processor cause the processor to:
 receive one or more machine problems and associated one or more fault codes;
 determine one or more machine problem classifications based on the one or more machine problems and the associated one or more fault codes that were received;
 generate a log of the one or more machine problems, the associated one or more fault codes, and the one or more machine problem classifications that were determined from a plurality of users for a predetermined time interval;
 generate a baseline probability distribution comprising the one or more machines problems with respect to the one or more machine problem classifications;
 for each fault code that was received, calculate a secondary probability distribution comprising a number of times that each of the associated fault codes occurred for the one or more machine problems classifications that were determined;
 determine that two or more fault codes in the log are significantly related to the one or more machine problems using a Chi-squared distribution test to compare the baseline probability distribution against each of the second probability distributions; and
 diagnose the machine problems using the one or more fault codes that were determined to be significantly related.

8. The apparatus according to claim 7, wherein the predetermined time interval is between about 2 and 10 days.

9. The apparatus according to claim 7, wherein two or more fault codes in the log are significantly related if and only if the two or more fault codes are pair wise favorably associated.

10. The apparatus according to claim 7, wherein two or more fault codes in the log are significantly related if and only if there is a path of events between the two or more fault codes that is step wise favorably associated.

11. The apparatus according to claim 7, wherein the machine problem classifications include one or more subsystems related to a machine type.

12. The apparatus according to claim 7, wherein the baseline probability distribution is a multinomial distribution.

13. A non-transitory computer-readable storage medium containing instructions which, when executed on a processor, perform a method for identifying significant events related to machine problems comprising:
 receiving one or more machine problems and associated one or more fault codes;
 determining one or more machine problem classifications based on the one or more machine problems and the associated one or more fault codes that were received;
 generating a log of the one or more machine problems, the associated one or more fault codes, and the one or more machine problem classifications that were determined from a plurality of users for a predetermined time interval;
 generating a baseline probability distribution comprising the one or more machines problems with respect to the one or more machine problem classifications;
 for each fault code that was received, calculating a secondary probability distribution comprising a number of times that each of the associated fault codes occurred for the one or more machine problems classifications that were determined;
 determining that two or more fault codes in the log are significantly related to the one or more machine problems using a Chi-squared distribution test to compare the baseline probability distribution against each of the second probability distributions; and
 diagnosing the machine problems using the one or more fault codes that were determined to be significantly related.

14. The non-transitory computer-readable storage medium according to claim 13, wherein two or more fault codes in the log are significantly related if and only if the two or more fault codes are pair wise favorably associated.

15. The non-transitory computer-readable storage medium according to claim 13, wherein two or more fault codes in the log are significantly related the event sequence is significant if and only if there is a path of events between the two or more fault codes that is step wise favorably associated.

* * * * *